United States Patent [19]

Scholl

[11] Patent Number: 5,781,957
[45] Date of Patent: Jul. 21, 1998

[54] CIRCULAR ICE SCRAPER

[76] Inventor: Jason K. Scholl, R.R. #2 Box 77, Ellsworth, Ill. 61737

[21] Appl. No.: 971,755

[22] Filed: Nov. 17, 1997

Related U.S. Application Data

[60] Provisional application No. 60/038,610 Mar. 6, 1997.

[51] Int. Cl.$^6$ .................. B60S 1/04; A47L 1/06; A47L 13/02
[52] U.S. Cl. ................. 15/236.02; 15/236.08; 30/169; D32/46
[58] Field of Search .............. 15/236.01, 236.02, 15/236.05–236.09; 30/169; D32/40, 46, 49

[56] References Cited

U.S. PATENT DOCUMENTS

| | | | |
|---|---|---|---|
| D. 46,895 | 2/1915 | Campbell | D32/46 |
| D. 309,206 | 7/1990 | Kelley | D32/46 |
| 2,299,089 | 10/1942 | Haan | 15/236.02 |
| 2,532,429 | 12/1950 | Sparkman | 401/183 |
| 3,133,301 | 5/1964 | Helminen | 15/236.02 X |
| 4,422,206 | 12/1983 | Brace et al. | 15/236.02 |
| 5,101,529 | 4/1992 | Tippie | 15/236.02 |
| 5,179,754 | 1/1993 | Stradnick | 15/105 |

FOREIGN PATENT DOCUMENTS

| | | | |
|---|---|---|---|
| 2028282 | 4/1992 | Canada . | |
| 2911934 | 10/1980 | Germany . | |
| 3341529 | 5/1985 | Germany | 15/236.02 |
| 4034848 | 5/1992 | Germany . | |

*Primary Examiner*—Mark Spisich
*Attorney, Agent, or Firm*—Richard C. Litman

[57] ABSTRACT

An ice scraper for use in removing frost and ice from vehicle windows. The ice scraper is formed from a hard plastic material into a circular disk with an easily gripped handle attached to its top. The body of the ice scraper is a concavo-convex disk with a circumferential edge that joins with the top surface of the disk to form a sharp cutting edge. A plurality of inclined ridges are formed on the cutting edge at regular spaced intervals; these ridges assist in breaking up ice as it is being scraped from a surface. The handle is integrally attached to the top of the disk. A plurality of finger receiving indentations are formed in the handle to allow the ice scraper to be gripped securely, with little effort.

5 Claims, 3 Drawing Sheets

CIRCULAR ICE SCRAPER

CROSS-REFERENCE TO RELATED APPLICATION

This application claims the benefit of U.S. Provisional patent application Ser. No. 60/038,610, filed Mar. 6, 1997.

BACKGROUND OF THE INVENTION

1. Field or the Invention

The present invention relates generally to a scraper for removing ice and frost from windshields and windows of motor vehicles and, more specifically, to an ice scraper with a circular scraping edge and an easily gripped handle.

2. Description of the Related Art

Every winter in the colder regions of the United States, people spend considerable time removing ice and frost from the windows of their cars, trucks, SUV's, etc., in order to safely drive them. The most common method of accomplishing the task is to scrape the ice off with a conventional ice scraper having a sharp cutting edge connected to a grip or handle. The majority of these devices have had straight cutting edges which sometimes do not lie flat on the curved surface of an automobile windshield during use, thereby decreasing the operational efficiency of these scrapers.

In order to correct this problem, a variety of edge shapes intended to lie flat against a curved surface have been disclosed in the prior art. These have included circular cutting edges with a variety of grips, some of which have included diverse features such a motors or illuminating devices.

U.S. Pat. No. 4,422,206, issued Dec. 27, 1983 to Arthur W. Brace and James M. Chmielewski, discloses an ice scraping tool which has two semicircular cutting edges joined by a concave body. In one embodiment, the body of the ice scraping tool has a pair of aligned slots separating the cutting edges and a T-shaped handle attached to the apex of the body. The semicircular cutting edges and concave body of the ice scraper of Brace and Chmielewski allow the majority of the cutting edges to lie flat against a curved window during use, unlike a straight cutting edge.

U.S. Pat. No. 5,101,529, issued Apr. 7, 1992 to Walter J. Tipple, discloses an ice scraping device with a circular cutting edge formed on the lower body portion of an upwardly tapering conic frustum. The generally cylindrical upper body portion has a flexible strap diametrically and pivotally mounted to its upper sides. The device is adapted to be held by placing one's hand over the top body portion and under the flexible strap, and then gripping the top body portion using the finger receiving recesses formed on opposite sides thereof.

U.S. Pat. No. 2,299,089, issued Oct. 20, 1942 to Bennie Haan, discloses a device for removing ice from automobile windows which has a smooth circular cutting edge flaring outwardly from the bottom of the device, and a narrow corrugated cutting edge threadably attached to the top of the device. The smooth circular cutting edge is intended for use with thin ice while the corrugated cutting edge is intended for use with thicker ice. The device is useful for handling varying ice conditions, but it lacks any finger receiving portions or other grip facilitating means.

U.S. Pat. No. 5,179,754, issued Jan. 19, 1993 to Loran J. Stradnick, discloses an ice scraper with a circular cutting edge and a long handle extending from the top of the body of the ice scraper. The handle is secured to the scraper body by threaded fasteners on the handle itself or on the scraper body and the handle may include illumination to allow the ice scraper to be used in low-light conditions.

Canadian Patent Number 2,028,282, issued Apr. 24, 1992 to Ramon Perez, discloses an ice scraping device which uses a circular brush member with a long handle attached thereto to scrape ice from an automobile windshield. The Brush is rotated rapidly by an electrically operated motor mounted in the handle, so little effort is required to use the device.

German Patent Number 2,911,934, issued Oct. 9, 1980 to Robert Schindler, discloses an ice scraping device which has several straight cutting edges arranged in a somewhat triangular pattern on the bottom of the device. The arrangement of cutting edges allows the device to scrape ice when it is being moved in several directions.

U.S. Design Pat. No. 309,206, issued Jul. 10, 1990 to Jeremy J. Keley, discloses a decorative design for an ice scraper having a circular cutting edge.

German Patent Number 4,034,848, issued May 7, 1992 to Bayerische Motoren Werke, discloses an ice scraper adapted to fit inside the gap formed on the inside of a vehicle filler cap flap which has a straight cutting edge. The cutting edge has ridges thereon to help break up the ice as it is being scraped.

None of the prior art, however, discloses a device for removing ice and frost from an automobiles windows which has a circular cutting edge with inclined ridges thereon and a concave body with a molded finger receiving grip formed on the top thereof that provides a solid and stable gripping means.

None of the above inventions and patents, taken either singularly or in combination, is seen to describe the instant invention as claimed. Thus a circular ice scraper solving the aforementioned problems is desired.

SUMMARY OF THE INVENTION

The present invention is an ice scraper generally intended for use in removing frost and ice from vehicle windows. The ice scraper is formed from a hard plastic material into a circular disk with an easily gripped handle attached to its top. The body of the ice scraper is a concavo-convex disk with a circumferential edge that joins with the top surface of the disk to form a sharp cutting edge for scraping ice and frost from a surface.

The handle, attached over the top of the apex of the disk, has the shape of an inverted U-shape. In order to make the ice scraper easy to use, a plurality of finger receiving indentations are formed in the horizontal portion of the handle and a plurality or inclined ridges are formed on the cutting edge at regular spaced intervals. The finger receiving indentations formed in the handle allow the ice scraper to be gripped securely with little effort and the inclined ridges help to break up ice as it is being scraped from a surface.

Accordingly, it is a principal object of the invention to provide an ice scraper with a greater operational efficiency than traditional ice scrapers.

It is another object of the invention to provide an ice scraper with an easily gripped handle formed thereon.

It is a further object of the invention to provide an ice scraper that is compact in design and easy to store.

Still another object of the invention is to provide an ice scraper which combines a circular cutting edge with inclined ridges formed thereon, a concavo-convex body portion, and a handle with finger receiving indentations formed therein.

It is an object of the invention to provide improved elements and arrangements thereof in a circular ice scraper for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
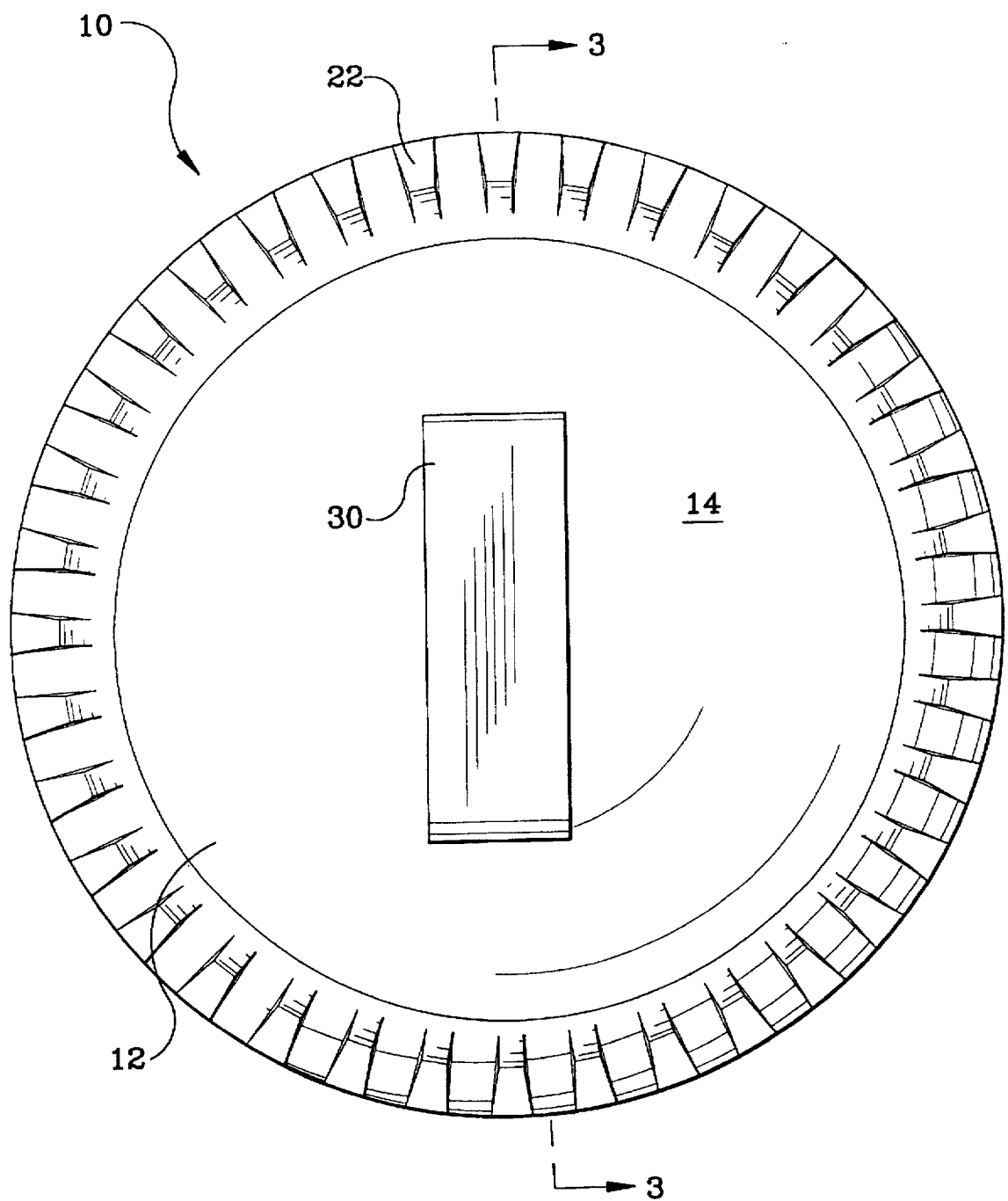
FIG. 1 is a top view of the circular ice scraper of the present invention.

Referring to the drawings, FIG. 1 is an illustration of the ice scraper 10 of the present invention adapted to be used to scrape ice and frost from the windshield and other windows of a vehicle. The ice scraper 10 is formed from a hard plastic material and generally comprises a scraper body 12 and a handle 30 which is integrally attached to the top of the scraper body 12.

Figure 3:
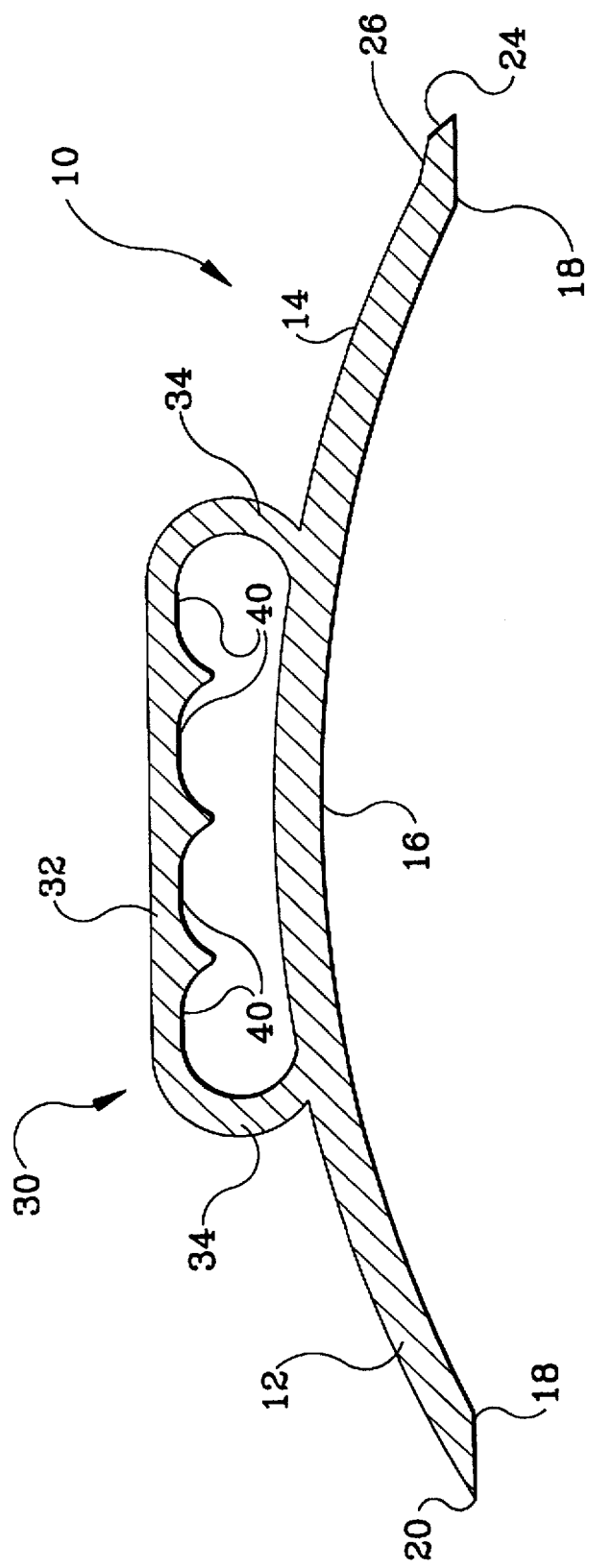
FIG. 3 is a cross sectional view of the circular ice scraper of the present invention, taken along line 3—3 in FIG. 1, showing the concavo-convex shape of the body of the ice scraper.

The scraper body 12 forms a disk having a convex top surface 14, a concave bottom surface 16, and a circumferential edge 18 which are shown in cross section in FIG. 3. The convex top surface 14 and the circumferential edge 18 are joined in V-fashion to form an acutely angled cutting/scraping edge 20 therebetween.

The plastic material from which the scraper is formed is hard enough (e.g., as measured by a durometer) to enable the cutting edge 20 to separate or scrape ice and frost from a window. However, the material is not harder than tempered glass itself; thus, the cutting edge 20 will not scratch the window.

Figure 2:
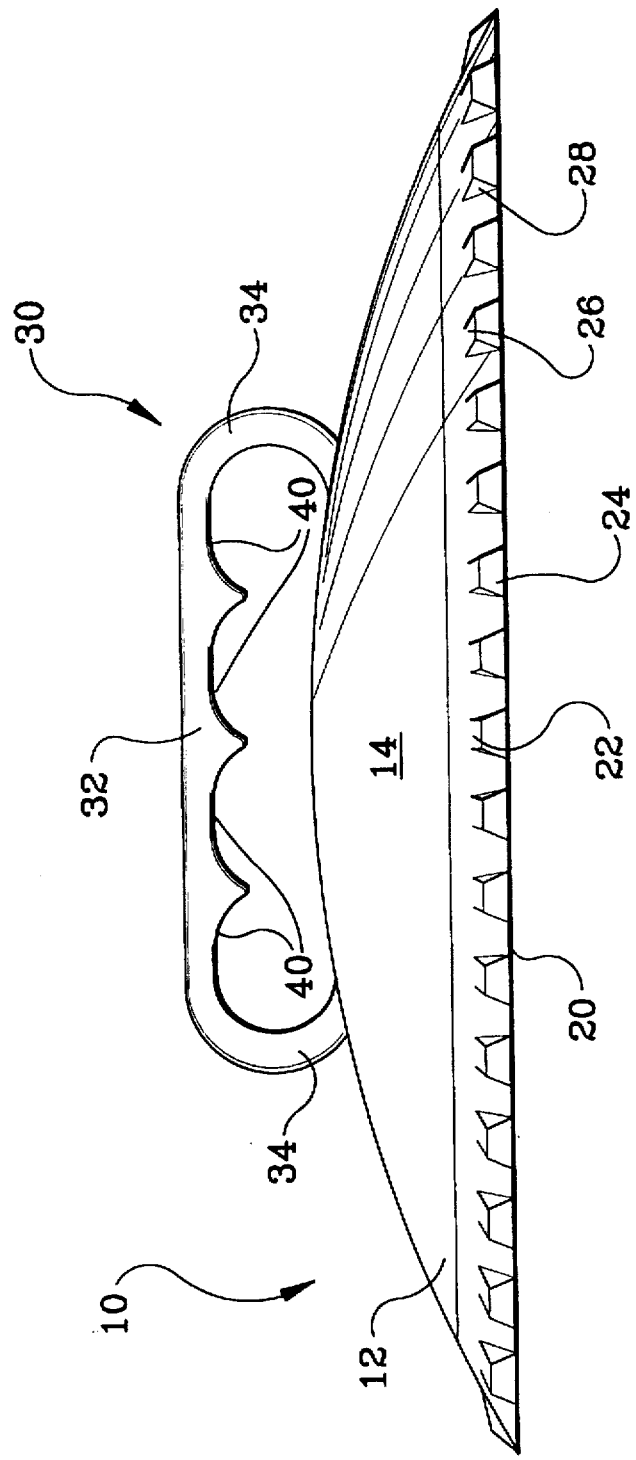
FIG. 2 is a side view of the circular ice scraper of the present invention showing the finger receiving indentations formed in the handle.

As is shown in FIG. 2, a plurality of inclined ridges 22 are formed at regular intervals on the top surface of the scraper body 12 adjacent the cutting edge 20. The inclined ridges are defined by an outermost surface 24, an uppermost surface 26, and two sidewalls 28. The outermost surface 24 forms an upwardly tapering trapezoid, the bottom of which joins the circumferential edge 18 at an angle less acute than the angle at which the convex top surface 14 of the scraper body 12 joins the circumferential edge 18. This is illustrated most clearly in FIG. 3. The uppermost surface 26 of the inclined ridge 22 forms a rectangle which extends generally horizontally from the top of the outermost surface 24 to the convex top surface 14 of the scraper body 12. The sidewalls 28 are triangular surfaces which join the convex top surface 14 of the scraper body 12 with the sides of the outermost surface 24 and the sides of the uppermost surface 26 of the inclined ridges 22.

This arrangement of the inclined ridges 22 on the convex top surface 14 of the scraper body 12 adjacent the cutting edge 20 helps to break up the ice being scraped from the window by the cutting edge 20. By breaking up the ice being scraped, the user of the ice scraper 20 is protected from being cut by large shards of ice which may have sharp edges.

Referring again to FIG. 2, the handle 30 is integrally attached to the top surface 14 of the scraper body 12 over the apex thereof. The handle 30 includes a horizontal member 32 and two vertical members 34. The vertical members 34 extend downwardly from the ends of the horizontal member 32 to the top surface 14 of the scraper body 12 so that the handle forms an inverted U-shape thereon.

The bottom surface of the horizontal member 32 has four finger receiving indentations 40 formed therein. The finger receiving indentations 40 are adapted to receive the index, middle, ring, and little fingers of a person as he or she grips the handle 30, so that the ice scraper 10 may be gripped firmly and securely with little effort.

In order to use the ice scraper 10 of the present invention, a user simply grasps the ice scraper 10 by the handle 30, places the cutting edge 20 flat on the surface from which the ice is to be removed, and moves and turns the ice scraper 10 in a random fashion over the surface while pressing down firmly on the handle 30. This allows the ice scraper to be effective when moved in a circular pattern or a variety of other patterns, unlike conventional ice scrapers.

The ice scraper 10 is like conventional ice scrapers, however, in that it may be imprinted with a logo or other printed material for advertising or other purposes. The bottom surface 16 and the convex top surface 14 of the scraper body 12 are particularly well suited for this as they provide a wide round surfaces on which to present the printed material. The top surface of the handle 30 also provides a space upon which material may be printed.

The overall circular shape of the ice scraper 10 and the compactness of the handle 30 also make the ice scraper easy to store. This is important given that a majority of people store ice scrapers in the somewhat limited space of an automobile.

It is to be understood that the present invention is not limited to the embodiment described above, but encompasses any and all embodiments within the scope of the following claims.

I claim:

1. A scraping tool comprising:

a scraper body configured as a disk having a convex top surface, a concave bottom surface, and a circumferential edge; and a handle in the shape of an inverted U-shape attached over the apex of said convex top surface to said scraper body; wherein, said circumferential edge and said convex top surface of said scraper body meet in V-fashion to form, in cross section, an acute angled cutting edge therebetween, said convex top surface of said scraper body adjacent said cutting edge has a plurality of inclined ridges formed at regular intervals around said cutting edge, said inclined ridges are each defined by an outermost surface, an uppermost surface, and two sidewalls, said outermost surface forms an upwardly tapering trapezoid having a top end and a bottom end, said bottom end of said outermost surface is joined with said circumferential edge of said scraper body in V-fashion at an angle, in cross section, less acute than the acutely angled cutting edge, said uppermost surface forms a rectangle extending from said top end of said outermost surface to said convex top surface of said scraper body, said sidewalls are generally triangular in shape and extend upward from said convex top surface of said scraper body to connect said convex top surface of said scraper body with said outermost surface and said uppermost surface of said inclined ridge, and said inclined ridges are arranged and configured to break up ice being removed from a surface by said cutting edge.

2. The scraping tool according to claim 1, wherein said handle comprises a horizontal member and two vertical members forming an inverted U-shape, said horizontal member has a top surface and a bottom surface, said bottom surface of said horizontal member has four finger receiving indentations formed therein, and said finger receiving indentations are adapted to receive the index, middle, ring, and little fingers on a person's hand.

3. The scraping tool as defined in claim 1, wherein said tool is formed entirely of plastic.

4. The scraping tool as defined in claim 3, wherein said plastic is less hard than tempered window glass, but sufficiently hard to separate and scrape ice and frost from the surface.

5. The scraping tool as defined in claim 1, wherein said scraping tool is of one-piece construction.

* * * * *